Patented May 17, 1938

2,117,859

UNITED STATES PATENT OFFICE 2,117,859

NEW AZO DYE AND COLOR LAKES AND THEIR PRODUCTION

Alfred Siegel, Roselle, N. J., assignor to E. I. du Pont de Nemours & Company, Wilmington, Del., a corporation of Delaware No Drawing. Application January 9, 1936, Serial No. 58,417

7 Claims. (Cl. 260—11)

This invention relates to mono-azo colors, being dyes and lakes. The invention also relates to methods of preparing the new colors.

It is an object of the invention to prepare new compounds which find particular utility as color pigments. Another object of the invention is to prepare dyes and lakes which are of utility among other things in the preparation of lithographic printing inks. Another object of the invention is to prepare the new colors, and to prepare materials incorporating the new compounds by methods which are economically and technically satisfactory. Other objects of the invention will be in part apparent and in part more fully hereinafter set forth.

The objects of the invention are accomplished, generally speaking, by combining diazotized 2-chlor-4-amino-toluene-5-sulfonic acid with one of a group of compounds consisting of naphthol sulfonic acids and naphthol carboxylic acids. Objects of the invention are also accomplished by preparing the new colors as acids or as salts of particular metals. Other objects of the invention are accomplished in greater or less degree by the means and methods and details thereof which are more fully hereinafter set forth.

In the practice of the invention the components are preferably combined under alkaline conditions. The dyes in the form of their sodium salts tend to be water-soluble, but in the forms of their alkaline-earth or heavy-metal salts tend to water-insolubility.

The following examples, in which parts are by weight, illustrate but do not limit the invention.

Example I 221.5 parts 2-chlor-4-amino-toluene-5-sulfonic acid were diazotized with hydrochloric acid and sodium nitrite in the usual manner. 375 parts 2-naphthol-3,6-disulfonic acid (100%) were dissolved in 1500 parts of hot water, 285 parts of soda ash were added, the mixture was increased to 2500 parts by the addition of water, the whole was cooled to 75° F., and a stiff paste separated out. The diazo suspension was gradually run into the R-salt paste at 75° F., incorporation requiring about one hour, and the whole was stirred for another hour; the coupling went rapidly and to completion. The alkaline dye was neutralized with hydrochloric acid to very slight alkalinity on brilliant yellow and was filtered. The product was about 602 parts of orange colored trisodium salt readily soluble in water. The compound is represented in the form of the sodium salt by the formula:

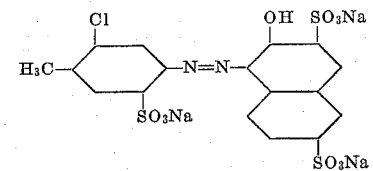

Example II 602 parts by weight of the trisodium salt of Example I were dissolved in 15,000 parts of water at the boil, and 40 parts of Para soap (the ammonium salt of Turkey red oil) dissolved in 400 parts of water were admixed therewith. The solution was stirred five minutes at the boil, and precipitated at the boil by running the dye solution over a period of 20 minutes, into a boiling solution of 800 parts of barium chloride in 5000 parts of water. The mixture was boiled for ten minutes, made slightly acid to blue litmus with hydrochloric acid, boiled 5 minutes, and flooded with water to 83,300 parts. After decantation the product was filtered, washed practically chloride free, and dried in the usual manner. The yield was approximately 760 parts by weight of the barium salt.

The product had a bright orange color of good fastness to light, oil, and water, was non-migrating in rubber, and when incorporated in lithographic varnish produced printing inks which possess excellent strength and brilliancy.

By using a soluble salt of another alkaline earth metal, such as the chloride or nitrate of calcium instead of barium chloride, the corresponding alkaline earth metal compounds are made.

Example III 602 parts by weight of the trisodium salt of the dye of Example I were dissolved in 15,000 parts of water at 150° F., to which were added 40 parts of Para soap (ammonium salt of Turkey red oil) dissolved in 400 parts of water. The dye was precipitated at 150° F. by running in at a rate of about 160 parts per minute a solution containing 1600 parts by weight of normal lead acetate (Pb(C₂H₃O₂)₂.3H₂O) and 5000 parts of water at 150° F. The mixture was gradually (15 minutes) heated to the boil and boiled for ten minutes, filtered, washed free of soluble lead salts, and dried. The yield was approximately 1000 parts by weight of dry pigment, which when ground in lithographic varnish produced inks of a deeper, redder, somewhat brighter, and bluer, but weaker shade than the above described barium pigment.

The color lakes may be prepared in full strength or with substrata such as barytes, blanc fixe, alumina hydrate, clay, magnesia, and other substrata used in the preparation of color lakes. The substrata may be added prior to or after laking of the dye.

The diazotized 2-chlor-4-amino-toluene-5-sulfonic acid also combines with 1-naphthol-5-carboxylic and 2-naphthol-6-carboxylic acids to give red dyes, the insoluble calcium and barium salts of which are deep bluish red in color.

The new compounds of my invention are superior in light-fastness, oil-fastness, and non-migrating properties in rubber to many pigments of the prior art. Methods by which they are obtained have the advantage of being technically and economically satisfactory. Another advantage of the invention is in the preparation of dyes, pigments, and color lakes of commercial value. Other advantages of the invention will be apparent to persons skilled in the arts to which the invention relates.

In general the compounds made by coupling diazotized 2-chlor-4-amino-toluene-5-sulphonic acid and the naphthol-disulphonic acids are represented by the following formula

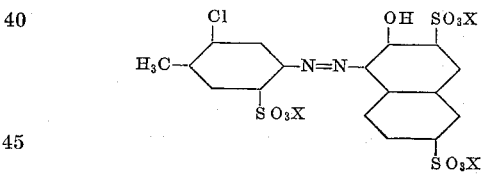

in which X is one of a group consisting of hydrogen, the alkaline earth metals, the alkali metals and lead.

As many apparently widely different embodiments of the invention may be made without departing from the spirit and scope thereof, it is to be understood that I do not limit myself to the specific embodiments thereof except as defined in the appended claims.

I claim:

1. The compounds represented by the formula:

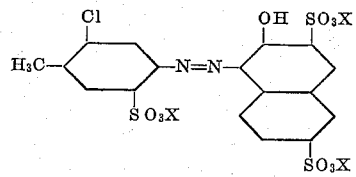

in which X is one of the group consisting of hydrogen, alkali metals, alkaline earth metals, and heavy metals.

2. The compound represented by the formula:

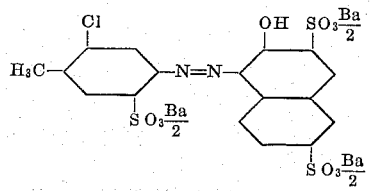

3. The compound represented by the formula:

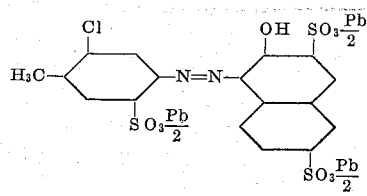

4. The process which comprises the addition of a solution of a water soluble salt of lead to a solution containing an alkali salt of the compound made by coupling diazotized 2-chlor-4-amino-toluene-5-sulphonic acid with 2-naphthol-3,6-disulphonic acid.

5. The process which comprises coupling diazotized 2-chlor-4-amino-toluene-5-sulfonic acid to the sodium salt of 2-naphthol-3,6-disulfonic acid, and adding thereto a solution containing barium chloride.

6. The process which comprises coupling diazotized 2-chlor-4-amino-toluene-5-sulfonic acid with 2-naphthol-3,6-disulfonic acid and reacting an alkali salt of said product with a soluble salt of an alkaline earth metal.

7. The process which comprises coupling diazotized 2-chlor-4-amino-toluene-5-sulfonic acid with 2-naphthol-3,6-disulfonic acid.

ALFRED SIEGEL.